United States Patent [19]

Cheng

[11] Patent Number: 5,437,208

[45] Date of Patent: Aug. 1, 1995

[54] ENGAGING DEVICE FOR SECURING A HANDLEBAR STEM OF A BICYCLE

[75] Inventor: Tien-Chu Cheng, Taichung Hsien, Taiwan

[73] Assignee: Kalloy Industrial Co., Ltd., Taichung Hsien, Taiwan

[21] Appl. No.: 194,419

[22] Filed: Feb. 10, 1994

[51] Int. Cl.⁶ .................. B62K 21/121; B25G 3/20
[52] U.S. Cl. ................... 74/551.1; 280/279; 403/24; 403/374
[58] Field of Search .......... 74/551.1–551.4, 74/551.8; 280/276, 279; 403/24, 374, 87, 103

[56] References Cited

U.S. PATENT DOCUMENTS

| | | | |
|---|---|---|---|
| 3,304,099 | 2/1967 | Jankowski | 280/279 X |
| 5,145,277 | 9/1992 | Fujita et al. | 403/374 |
| 5,197,349 | 3/1993 | Herman | 74/551.3 |
| 5,232,304 | 8/1993 | Huang | 403/374 |
| 5,285,696 | 2/1994 | Taylor | 74/551.1 |
| 5,285,698 | 2/1994 | Liao | 403/87 X |
| 5,297,445 | 3/1994 | Chen | 74/551.8 X |
| 5,299,467 | 4/1994 | Marui | 74/551.3 X |

FOREIGN PATENT DOCUMENTS

| | | | |
|---|---|---|---|
| 370723 | 2/1907 | France | 403/374 |
| 2416156 | 8/1979 | France | 74/551.1 |
| 565696 | 11/1944 | United Kingdom | 74/551.1 |

Primary Examiner—Vinh T. Luong
Attorney, Agent, or Firm—Bacon & Thomas

[57] ABSTRACT

An engaging device for securing a handlebar stem of a bicycle includes a handlebar stem which has vertical and level portions, the level portion having an opening formed in a side wall of the level portion and communicating to an interior of the vertical portion, the vertical portion being a tubular element for receiving an upper end of a front fork therein. A main tapered element and two side tapered elements are disposed in the level portion through the opening, the main tapered element having a recess formed in a rear end thereof for engaging with the front fork and having a slant formed on lateral sides thereof, the side tapered element having a slant corresponding to that of the main tapered element. The main tapered element is forced to push toward the front fork with the recess by the side tapered elements when threading the bolt.

3 Claims, 3 Drawing Sheets

ENGAGING DEVICE FOR SECURING A HANDLEBAR STEM OF A BICYCLE

BACKGROUND OF THE INVENTION

The present invention relates to an engaging device, and more particularly to an engaging device for securing a handlebar stem of a bicycle.

There are two kinds of conventional engaging devices for securing a handlebar stem, one of which has lugs and bolts disposed on an outer peripheral surface of the stem and that spoils the outer appearance thereof. The other has an engaging device disposed hiddenly in a level portion of a stem but its engaging effect is poor.

The present invention intends to mitigate and/or obviate the above mentioned problems.

SUMMARY OF THE INVENTION

The present invention relates to an engaging device for securing a handlebar stem of a bicycle, and more particularly to a main tapered element and two side tapered elements disposed in a level portion of the handlebar stem by threading a bolt therethrough, a front fork being securely engaged in a vertical portion of the handlebar stem by a utilization of two side tapered elements pushing the main tapered element against the front fork.

Further objects, advantages, and novel features of the invention will become more apparent from the following detailed description when taken in conjunction with the accompanying drawings.

DETAILED DESCRIPTION OF THE PREFERRED EMBODIMENTS

Figure 1:
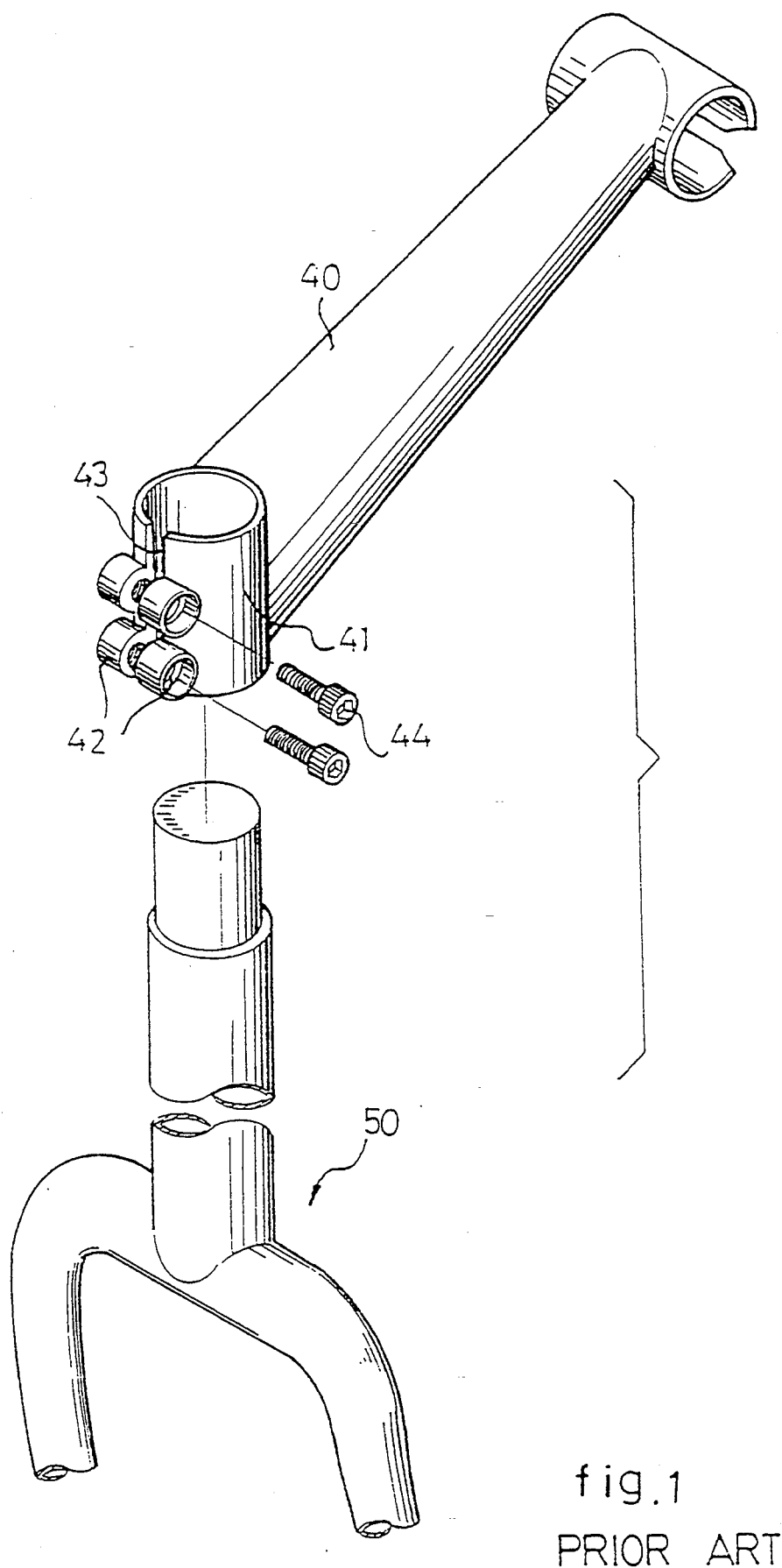
FIG. 1 is an exploded view of a conventional engaging device for securing a handlebar stem.

Referring to FIG. 1, a conventional engaging device for securing a handlebar stem of a bicycle is shown, and which comprises a tube 41 engaged on an upper end of a front fork 50, a level portion 40 having a first end fixed on the tube 41 and having a second end for engaging with a handlebar (not shown), the tube 41 includes a slot 43 vertically formed therein and a pair of lugs 42 being formed on opposite edges adjacent the slot 43 and which can be fixed by two bolts 44 extending therethrough. The lugs 42 and the bolts 44 are exposed and are apt to be rusted.

Figure 2:
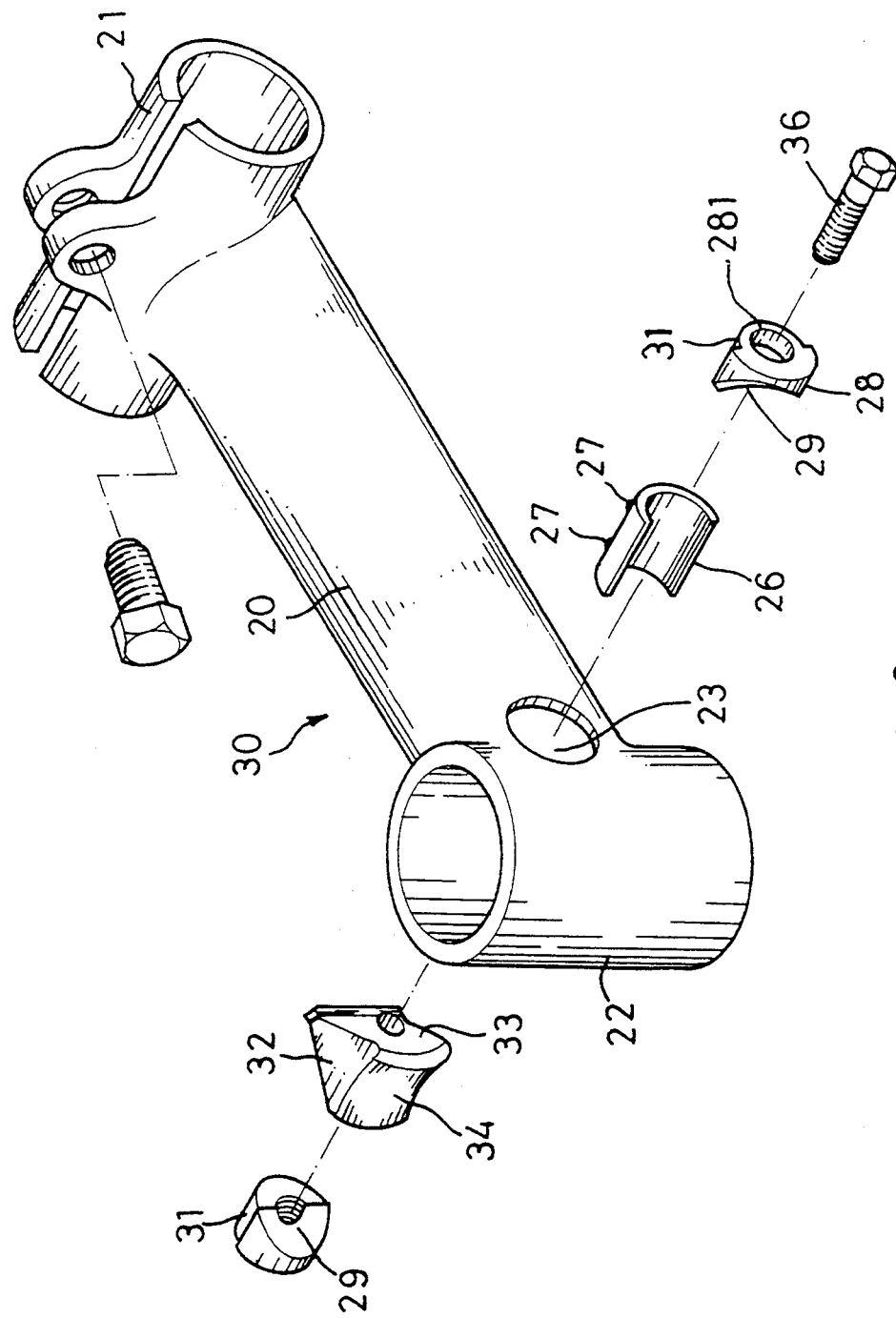
FIG. 2 is an exploded view, partly in section, of an engaging device for securing a handlebar stem of a bicycle in accordance with the present invention.
Figure 3:
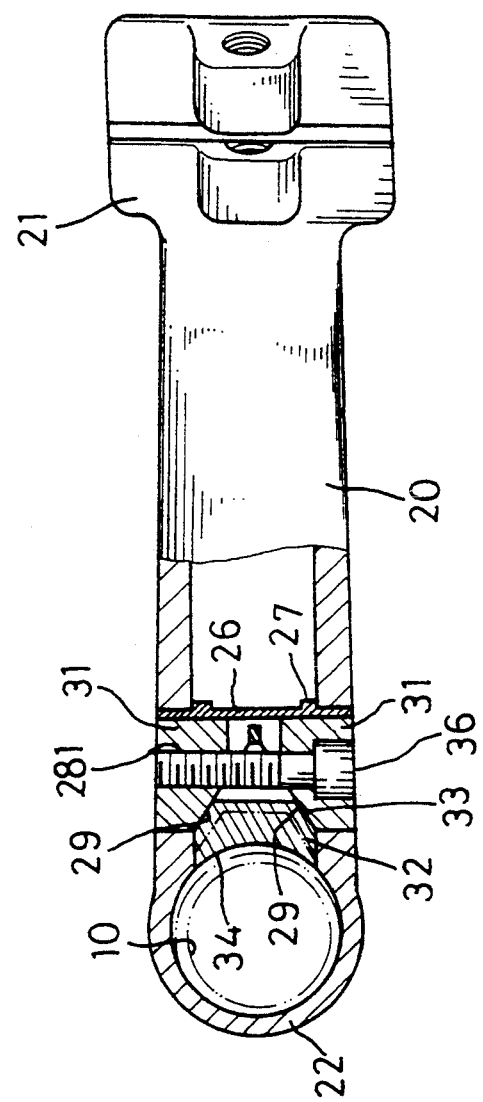
FIG. 3 is a top elevational view, partly in section, of the device in accordance with the present invention.

Referring now to FIGS. 2 and 3, an engaging device for securing a handlebar stem of a bicycle in accordance with the present invention includes a handlebar stem 30 which has vertical and level portions 22, 20, the level portion 20 having a receiving element 21 formed on a free end thereof for securing a handlebar (not shown) therein and the vertical portion 22 being a tubular element in which a front fork 10 is received. An opening 23 communicating to an interior of the vertical portion 22 is formed in a lateral side wall of the level portion 20 for receiving the engaging device therein. The engaging device comprises a main tapered element 32 and two side tapered elements 31, each of which has a through hole 281 for a bolt 36 extending therethrough. The main tapered element 32 is a triangle-shaped body whose rear end is a recess 34 for engaging with an upper end of the front fork, and has a slant 33 formed in each side thereof. Each side tapered element 31 has a tubular element and has a slant 29 corresponding to that of the main tapered element 32. A half-loop-shaped plate 26 having two projections 27 formed on an outer peripheral surface thereof is inserted in the level portion 20 and is engaged therewith by disposing the projections 27 against two sides of the side wall of the level portion 20.

In assembling, the plate 26 is engaged in the level portion 20 and two side tapered elements 31, 31 and main tapered element 32 are inserted through the opening 23 and received within the plate 26. The two side tapered elements 31, 31 are received in both ends of the plate 26 respectively. A bolt 36 is then extends through the three tapered elements 31, 32, 31 and each the side tapered elements 31, 31 exerts a force on the slant 33 of the main tapered element 32 so as to push the recess 34 of the main tapered element 32 against the front fork 10 so as to securely mount the handlebar stem on the front fork 10.

Accordingly, the present invention provides a handlebar stem having a smooth configuration and without any conventional engaging element exposed thereon. In addition, the utilization of tapered elements 31, 32, 31 provides an adjustable effect, i.e. the engagement between the front fork 10 and the handlebar stem can be easily adjusted by threading the bolt 36.

Although the invention has been explained in relation to its preferred embodiment, it is to be understood that many other possible modifications and variations can be made without departing from the spirit and scope of the invention as hereinafter claimed.

I claim:

1. An engaging device for securing a handlebar stem of a bicycle comprising a handlebar stem having vertical and level portions, said level portion having a receiving element formed on a free end thereof for securing a handlebar therein, an opening being formed in a side wall of said level portion and communicating to an interior of said vertical portion; said vertical portion being a tubular element for receiving an upper end of a front fork therein, a main tapered element and two side tapered elements being disposed in said level portion through said opening, said main tapered element having a recess formed in a rear end thereof for engaging with said front fork and having a slant formed on both lateral sides thereof, said side tapered element having a slant corresponding to that of said main tapered element, said main tapered element being forced to push toward said front fork with its recess by said side tapered elements when threading a bolt.

2. The device as claimed in claim 1 wherein a plate is engaged with said level portion and said main tapered element and said side tapered elements are received within said plate.

3. The device as claimed in claim 2 wherein two projections are formed on an outer peripheral surface of said plate and are engaged with two side walls of said level portion.

* * * * *